United States Patent Office 3,775,517
Patented Nov. 27, 1973

3,775,517
1-PHENYL-2-CYANO-2-METHYLVINYL-THIONO-
PHOSPHORIC(PHOSPHONIC) ACID ESTERS
Hans-Jochem Riebel, Wuppertal-Elberfeld, Ingeborg
Hammann, Cologne, and Günter Unterstenhöfer,
Opladen, Germany, assignors to Bayer Aktiengesellschaft, Leverkusen, Germany
No Drawing. Filed Oct. 4, 1971, Ser. No. 186,562
Claims priority, application Germany, Oct. 9, 1970,
P 20 49 695.1
Int. Cl. A01n 9/36; C07f 9/40
U.S. Cl. 260—940                                    7 Claims

ABSTRACT OF THE DISCLOSURE

1 - phenyl - 2 - cyano-2-methylvinyl-thionophosphoric (phosphonic) acid esters of the general formula

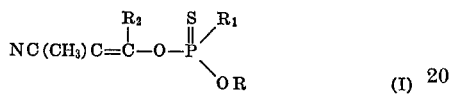

in which

R is an alkyl radical with 1 to 6 carbon atoms,
$R_1$ is an alkyl or alkoxy radical with 1 to 6 carbon atoms or a phenyl radical, and
$R_2$ is a phenyl radical optionally substituted by at least one halogen, nitro, lower alkyl, alkoxy or alkylmercapto radical, which possess insecticidal and acaricidal properties.

---

The present invention relates to and has for its objects the provision of particular new 1-phenyl-2-cyano-2-methylvinyl-thionophosphoric(phosphonic) acid esters, i.e. O,O-dialkyl - O - [1-(optionally substituted-phenyl)-2-cyano-2-methylvinyl]-thionophosphates or O-alkyl-O-[1-(optionally substituted-phenyl)-2-cyano-2-methylvinyl]-alkane- or benzenethiono-phosphonates, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known that 2-chloro-1-(2',4',5'-trichlorophenyl)-vinyldimethyl phosphate (U.S. patent specification 3,102,842), 2-chloro-1-(2',4'-dichlorophenyl)-vinyldiethyl phosphate (U.S. patent specification 3,003,916) and 2-cyano-2-phenyl-1-methylvinyl-diethyl thionophosphate (Y. Nishizawa, Bull. Agr. Chem. Soc. Japan, 25, 61 (1961) and published Japanese patent application 2,926 (1960)) exhibit insecticidal properties.

The present invention provides 1-phenyl-2-cyano-2-methylvinyl-thionophosphoric(phosphonic) acid esters of the general formula

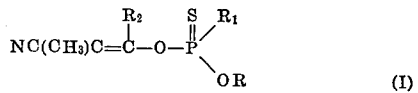

in which

R is an alkyl radical with 1 to 6 carbon atoms,
$R_1$ is an alkyl or alkoxy radical with 1 to 6 carbon atoms or a phenyl radical, and
$R_2$ is a phenyl radical optionally substituted by at least one halogen, nitro, lower alkyl, alkoxy or alkylmercapto radical.

It has been found that such compounds exhibit strong insecticidal and acaricidal properties.

The general Formula I includes the following corresponding cis- and trans-isomers of the constitutions (II) and (III) or mixtures of these two components.

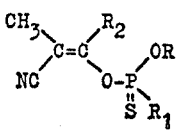   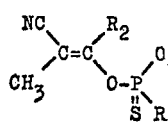

cis                                trans
(II)                               (III)

The invention also provides a process for the production of a 1-phenyl-2-cyano-2-methylvinyl-thionophosphoric(phosphonic) acid ester of Formula I in which
(a) a benzoylpropionitrile derivative of the formula

is reacted, in the form of its alkali metal salt, alkaline earth metal salt or ammonium salt or in the presence of an acid-binding agent, with a thionophosphoric(phosphonic) acid ester halide of the formula

in which

R, $R_1$, and $R_2$ have the meanings stated above, and
Hal stands for a halogen atom, preferably chlorine, or (b) a benzoic acid ester of the formula

in which $R_2$ has the meaning stated above, and
$R_3$ stands for a straight-chain or branched alkyl radical with 1 to 6 carbon atoms, is condensed with propionitrile in the presence of a base and, after completion of the reaction, is reacted, preferably without isolation of the intermediate product, with a thionophosphoric(phosphonic) acid ester halide of the Formula V.

Surprisingly, the 1 - phenyl - 2 - cyano-2-methylvinyl-thionophosphoric(phosphonic) acid esters according to the invention show a remarkably better insecticidal and acaricidal activity than the known 2-chloro-1-(2',4',5'-trichlorophenyl) - vinyl - dimethyl phosphate (Compound A) or 2 - chloro - 1-(2',4'-dichlorophenyl)-vinyl-diethyl phosphate (Compound B) and 2-cyano-2-phenyl-1-methylvinyl-diethylthionophosphate (Compound C) of analogous constitution and the same type of activity. The substances according to the invention therefore represent a genuine enrichment of the art.

If, as starting materials, benzoylpropionitrile or its sodium salt and O,O-diethylthionophosphoric acid ester chloride are used according to process variant (a) or benzoic acid ethyl ester and propionitrile and O,O-diethylthionophosphoric acid ester chloride are used according to process variant (b), the reaction courses can be represented by the following formula schemes:

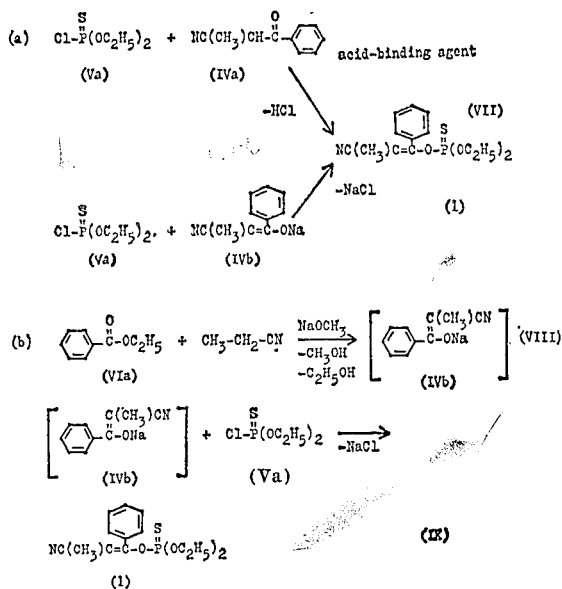

Preferably, R in the various formulate stands for a straight-chain or branched lower alkyl radical with 1 to 4 carbon atoms, such as methyl, ethyl, n- and iso-propyl, n-, sec.-, tert.- and iso-butyl, and $R_1$ stands for an alkyl or alkoxy radical with 1 to 4 carbon atoms, or a phenyl radical, while $R_2$ preferably is a phenyl radical which may be substituted one or more times by chlorine or bromine atoms, and/or lower alkyl or alkoxy radicals with 1 to 4 carbon atoms.

As examples of thionophosphoric(phosphonic) acid ester halides, benzoylpropionitrile derivatives or benzoic acid esters to be used according to the process, there are mentioned in particular: O,O-dimethyl-, O,O-diethyl-, O,O-di-iso-propyl-, O,O-dipropyl-, O,O-dibutyl-, O,O-di-tert.-butyl-, O-methyl-O-ethyl-, O-methyl-O-iso-propyl-, O-ethyl-O-iso-propyl-, O-propyl-O-butyl and O-ethyl-O-tert.-butyl-thionophosphoric acid ester chloride; further, O - methyl - methane-, O - ethyl - methane-, O-iso-propyl-methane-, O-butyl-ethane-, O-iso-propyl-ethane-, O-propyl-ethane-, O-methyl-propane-, O-methyl-iso-propane-, O-ethyl-iso-propane-, O-propyl-butane-, O-methyl-butane- and O-ethyl-butane-thionophosphonic acid ester chloride; further, 2-, 3- and 4-chloro-, 2-, 3- and 4-bromo-, 2,3-, 2,6- and 3,4-dichloro-, 2,3,4-, 2,3,5-, 2,3,6-, 2,4,6-, 2,4,5-, and 3,4,5 - trichloro-, 2-, 3- and 4-methoxy-, 2-, 3- and 4-ethoxy-, 4 - methyl-, 4 - ethyl-, 4 - iso-propyl- and 4-tert.-butyl-benzoylpropionitrile or -benzoic acid ethyl or -methyl ester.

The thionophosphoric(phosphonic) acid ester halides of the constitution (V) required as starting materials are known from the literature and can, like benzoic acid esters (VI) which are described in the literature or like benzoylpropionitrile derivatives (IV) some of which are described in the literature, be prepared according to customary processes, the latter from benzoic acid alkyl esters with alcoholates and propionitrile, as shown hereinbelow in Example 9.

Both process variants can be carried out in the presence or absence of solvents.

In addition to water as solvent when carrying out the processes, practically all inert organic solvents and diluents can be used. These include preferably aliphatic and aromatic optionally chlorinated hydrocarbons, such as benzene, toluene, xylene, benzine, chlorobenzene; ethers, e.g. diethyl and dibutyl ether, dioxane; further, ketones, such as acetone, methylethyl, methyl-iso-propyl and methyl-iso-butyl ketone; and nitriles, for example acetonitrile and propionitrile.

As acid acceptors, all customary acid-binding agents are suitable. Particularly suitable are alkali metal carbonates and alcoholates, such as sodium and potassium carbonate, methylate or ethylate; further, aliphatic, aromatic or heterocyclic amines, for example triethylamine, dimethylamine, dimethylaniline, dimethylbenzylamine and pyridine. Preferably, about one mole equivalent of potassium or sodium carbonate is used.

The reaction temperatures can be varied within a fairly wide range. In general, the reaction is carried out at from about —10 to 100, preferably at about 20 to 60° C.

The reactions are, in general, carried out at normal pressure.

When carrying out process variant (a), in general there is used, per mole of thionophosphoric(phosphonic) acid ester halide, 1 mole of the benzoylpropionitrile derivative in the form of its alkali metal or alkaline earth metal salt or the reaction is carried out in the presence of about 1 mole of an acid-binding agent, possibly in one of the solvents stated, at the temperatures stated. After several hours' stirring—optionally with heating—the reaction mixture is worked up in customary manner.

When carrying out process variant (b), there is generally used, per mole of benzoic acid ester, 1.25 moles of propionitrile in the presence of 1 mole of base, preferably sodium alcoholate. After the condensation has ended, the alcohol formed during the reaction is distilled off. Then the mixture is in most cases diluted with acetonitrile or acetone and the phosphorylation is preferably carried out at a temperature of about 40 to 60° C. Here, too, the working up of the reaction mixture takes place according to customary methods.

The substances according to the invention are obtained in most cases in the form of colorless to red-colored, viscous, water-insoluble oils which can be distilled without decomposition. They can also, by so-called "slight distillation," that is, longer heating to moderately elevated temperatures under reduced pressure, be freed from the last volatile constituents and in this way can be purified. For their characterization, the refractive index is particularly useful.

As already mentioned the compounds according to the invention are distinguished by an outstanding acaricidal and insecticidal effectiveness against crop pests, hygiene pests and pests of stored products, as well as ectoparasites. They possess a good activity against both sucking and eating insects and mites. For this reason, the compounds according to the invention can be used with success as pesticides in crop protection and the protection of stored products as well as in the hygiene and veterinary field.

To the sucking insects contemplated herein these belong, in the main, aphids (Aphidae) such as the green peach aphid (*Myzus persicae*), the bean aphid (*Doralis fabae*), the bird cherry aphid (*Rhopalosiphum padi*), and the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (*Myzus cerasi*); in addition, scales and mealybugs (*Coccina*), for example the oleander scale (*Aspidiotus hederae*) and the soft scale (*Lecanium hesperidum*) as well as the grape mealybug (*Pseudococcus maritimus*); thrips (*Thysanoptera*), such as Hercinothrips femoralis, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*; and the like.

In the case of the biting insects contemplated herein, above all there should be mentioned butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*), and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (Coleoptera), for example the granary weevil (*Sitophilus granarius=Calandra granaria*), the Colorado beetle (*Leptinotarsa decemlineata*), the dock beetle (*Gastrophysa viridula*), the mustard beetle (*Phaedon cochleariae*), the blosson beetle (*Meligethes aeneus*), the raspberry beetle (*Byturus tomentosus*), the bean weevil (*Bruchidius=Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafter (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and blue-bottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius=Tetranychus althaeae* or *Tetranychus urticae*) and the European red mite (*Paratetranychus pilosus=Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When applied against hygiene pests and pests of stored products, particularly flies and mosquitoes, the new compounds are also distinguished by an outstanding residual activity on wood and clay, as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as Freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), paraffins (e.g. petroleum or mineral oil fractions), chlorinated aliphatic hydrocarbons (e.g. methylene chloride, chloroethylenes, etc.), cycloaliphatic hydrocarbons (e.g. cyclohexane, etc.), alcohols (e.g. methanol, ethanol, propanol, butanol, glycol, etc.), ethers or esters of such alcohols, amines (e.g. ethanolamine, etc.), ether-alcohols (e.g. glycol monomethyl ether, etc.), ketones (e.g. acetone, methyl ethyl ketone, methyl isobutyl ketone, cyclohexanone, etc.), or strongly polar solvents such as amides (e.g. dimethyl formamide, etc.), sulfoxides (e.g. dimethyl sulfoxide, etc.) or acetonitrile, and/or water; as well as inert dispersible finely divided solid carriers, such as ground natural minerals (e.g. kaolins, clays, alumina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides, insecticides, fungicides, bactericides and nematocides, rodenticides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

The active compounds can also be used in accordance with the well-known ultra-low-volume process with good success, i.e. by applying such compound if normally a liquid or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 100 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above.

The instant formulations or compositions are applied in the usual manner, for instance by spraying, atomizing, vaporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples.

EXAMPLE 1

Phaedon larvae test (plant-damaging insects)

Solvent: 3 parts by weight acetone.
Emulsifier: 1 part by weight alkylaryl polyglycol ether.

To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 1:

TABLE 1
[Phaedon larvae test]

| Active compound | | Concentration of active compound in percent | Degree of destruction in percent after 3 days |
|---|---|---|---|
| ClCH=C(O-P(OC$_2$H$_5$)$_2$)-C$_6$H$_3$Cl$_2$ (known) | (B) | 0.1<br>0.01<br>0.001 | 100<br>70<br>0 |
| NC-C=C(CH$_3$)-O-P(S)(OC$_2$H$_5$)$_2$ phenyl (known) | (C) | 0.1<br>0.01 | 100<br>0 |
| NC(H$_3$C)C=C-O-P(S)(OC$_2$H$_5$)$_2$ phenyl | (1) | 0.1<br>0.01<br>0.001 | 100<br>100<br>95 |
| NC(H$_3$C)C=C-O-P(S)(OC$_2$H$_5$)(C$_2$H$_5$) phenyl | (2) | 0.1<br>0.01<br>0.001 | 100<br>100<br>75 |
| NC(H$_3$C)C=C-O-P(S)(OC$_2$H$_5$)$_2$ phenyl-Br | (12) | 0.1<br>0.01<br>0.001 | 100<br>100<br>60 |
| NC(H$_3$C)C=C-O-P(S)(OC$_2$H$_5$)(CH$_3$) phenyl-Br | (13) | 0.1<br>0.01<br>0.001 | 100<br>100<br>100 |
| NC(H$_3$C)C=C-O-P(S)(OC$_2$H$_5$)(C$_2$H$_5$) phenyl-OCH$_3$ | (7) | 0.1<br>0.01<br>0.001 | 100<br>100<br>50 |

EXAMPLE 2

Myzus test (contact action)

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2:

TABLE 2
[Myzus test]

| Active compound | | Concentration of active compound in percent | Degree of destruction in percent after 1 day |
|---|---|---|---|
| ClCH=C(—O—P(OC$_2$H$_5$)$_2$)(=O) with 2-Cl, 4-Cl phenyl (known) | (B) | 0.1<br>0.01 | 100<br>40 |
| ClCH=C(—O—P(OCH$_3$)$_2$)(=O) with 2-Cl, 3-Cl, 4-Cl phenyl (known) | (A) | 0.1 | 0 |
| NC—C=C(CH$_3$)—O—P(OC$_2$H$_5$)$_2$ (=S) phenyl (known) | (C) | 0.1<br>0.01 | 98<br>20 |
| NC(H$_3$C)C=C—O—P(OC$_2$H$_5$)$_2$ (=S) 2-Br phenyl | (12) | 0.1<br>0.01<br>0.001 | 100<br>100<br>100 |
| NC(H$_3$C)C=C—O—P(=S)(OC$_2$H$_5$)(CH$_3$) 2-Br phenyl | (13) | 0.1<br>0.01<br>0.001 | 100<br>100<br>98 |

EXAMPLE 3

Tetranychus test

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3:

TABLE 3
[Tetranychus test]

| Active compound | | Concentration of active compound in percent | Degree of destruction in percent after 2 days |
|---|---|---|---|
| ClCH=C(—O—P(OCH$_3$)$_2$)(=O) with 2-Cl, 3-Cl, 4-Cl phenyl (known) | (A) | 0.1 | 0 |
| NC—C=C(CH$_3$)—O—P(OC$_2$H$_5$)$_2$ (=S) phenyl (known) | (C) | 0.1 | 0 |
| NC(H$_3$C)C=C—O—P(OC$_2$H$_5$)$_2$ (=S) phenyl | (1) | 0.1 | 0 |
| NC(H$_3$C)C=C—O—P(=S)(OC$_2$H$_5$)(C$_2$H$_5$) phenyl | (2) | 0.1 | 100 |
| NC(H$_3$C)C=C—O—P(OC$_2$H$_5$)$_2$ (=S) 4-Cl phenyl | (8) | 0.1 | 90 |
| NC(H$_3$C)C=C—O—P(=S)(OC$_2$H$_5$)(C$_2$H$_5$) 4-Cl phenyl | (9) | 0.1 | 95 |
| NC(H$_3$C)C=C—O—P(OC$_2$H$_5$)$_2$ (=S) 2-Br phenyl | (12) | 0.1 | 98 |

TABLE 3—Continued

[Tetranychus test]

| Active compound | Concentration of active compound in percent | Degree of destruction in percent after 2 days |
|---|---|---|
| NC(H₃C)C=C—O—P(S)(OC₂H₅)(CH₃)—C₆H₄—Br  (13) | 0.1<br>0.01 | 100<br>80 |

EXAMPLE 4

Phorodon normally sensitive and resistant test (contact action)

Solvent: 3 parts by weight acetone.
Emulsifier: 1 part by weight alkylarylpolyglycol ether.

To produce a suitable preparation of active compound, 1 part by weight of the active compound is mixed with the stated amount of solvent containing the stated amount of emulsifier, and the concentrate is diluted with water to the desired concentration.

Hop plants (*Humulus lupulus*) which have been heavily infested with the hop aphid (*Phorodon humuli*) are sprayed with the preparation of the active compound until dripping wet.

After the specified periods of time, the degree of destruction is determined as a percentage. 100% means that all the aphids were killed; 0% means that none of the aphids were killed.

The active compounds, the concentrations of the active compounds, the evaluation times and the results can be seen from the following Table 4:

TABLE 4

[*Phorodon humuli* test]

| Active compound | | Concentration of active compound in percent | Degree of destruction in percent after 1 day | |
|---|---|---|---|---|
| | | | Normally sensitive | Resistant |
| NC—C(S)=C(CH₃)—O—P(OC₂H₅)₂ (phenyl) (known) | (C) | 0.1<br>0.02<br>0.004 | ----<br>90<br>80 | 30<br>25<br>20 |
| ClCH=C(O)—O—P(OCH₃)₂ (2,4,5-trichlorophenyl) (known) | (A) | 0.1<br>0.02 | ----<br>50 | 50<br>10 |
| NC(H₃C)C=C—O—P(S)(OC₂H₅)(CH₃)—C₆H₄—Br | (13) | 0.1<br>0.02<br>0.004<br>0.0008<br>0.00016 | ----<br>100<br>100<br>100<br>90 | 100<br>100<br>100<br>80<br>10 |
| NC(H₃C)C=C—O—P(S)(OC₂H₅)₂—C₆H₄—Br | (12) | 0.1<br>0.02<br>0.004<br>0.0008<br>0.00016 | ----<br>100<br>100<br>100<br>80 | 100<br>100<br>90<br>30<br>10 |

EXAMPLE 5

Mosquito larvae test

Test animals: *Aedes aegypti* larvae.
Solvent: 99 parts by weight acetone.
Emulsifier: 1 part by weight benzylhydroxydiphenylpolyglycol ether.

To produce a suitable preparation of active compound, 2 parts by weight of the active compound are dissolved in 1000 parts by volume of the solvent containing the amount of emulsifier stated above. The solution thus obtained is diluted with water to the desired lower concentrations.

The aqueous preparations of the active compounds are placed in glass vessels and about 25 mosquito larvae are then placed in each glass vessel.

After 24 hours, the degree of destruction is determined as a percentage. 100% means that all the larvae are killed. 0% means that no larvae at all are killed.

The active compounds, the concentrations of the active compounds, the test animals and the results can be seen from the following Table 5:

TABLE 5
[Mosquito larvae test]

| Active compound | | Concentration of active compound of the solution in p.p.m. | Degree of destruction in percent |
|---|---|---|---|
| 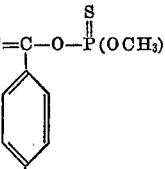 (known) | (B) | 10<br>1 | 100<br>60 |
|  (known) | (C) | 10 | 80 |
| 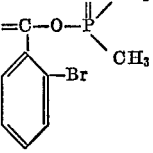 | (2) | 10<br>1<br>0.1 | 100<br>100<br>100 |
| 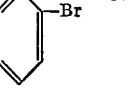 | (5) | 10<br>1<br>0.1 | 100<br>100<br>50 |
| 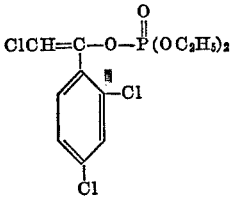 | (10) | 10<br>1<br>0.1 | 100<br>100<br>60 |
|  | (12) | 10<br>1<br>0.1 | 100<br>100<br>100 |
| 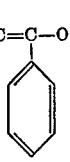 | (13) | 10<br>1<br>0.1<br>0.01 | 100<br>100<br>100<br>40 |

EXAMPLE 6

Tetranychus resistant test

Solvent: 3 parts by weight acetone.
Emusifier: 1 part by weight alkylarylpolyglycol ether.

To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 6:

TABLE 6
[Tetranychus urticae test/resistant]

| Active compound | | Concentration of active compound in percent | Degree of destruction in percent after 8 days | |
|---|---|---|---|---|
| | | | Phosphoric acid ester resistant | Carbamate resistant |
| ClCH=C(—O—P(OC$_2$H$_5$)$_2$)(=O) with 2,4-dichlorophenyl (known) | (B) | 0.1 | 0 | 0 |
| NC—C(=C(CH$_3$))—O—P(=S)(OC$_2$H$_5$)$_2$ with phenyl (known) | (C) | 0.1 | 0 | 0 |
| NC(H$_3$C)C=C—O—P(=S)(OC$_2$H$_5$)(CH$_3$) with 2-Br phenyl | (13) | 0.1 | 100 | 98 |
| NC(H$_3$C)C=C—O—P(=S)(OC$_2$H$_5$)(C$_2$H$_5$) with phenyl | (2) | 0.1 | 95 | 98 |
| NC(H$_3$C)C=C—O—P(=S)(OC$_2$H$_5$)(C$_2$H$_5$) with 4-Cl phenyl | (9) | 0.1 | 98 | 98 |
| NC(H$_3$C)C=C—O—P(=S)(OC$_2$H$_5$)$_2$ with 2-Br phenyl | (12) | 0.1 | 98 | 98 |

EXAMPLE 7

Test with parasitizing fly larvae

Solvent: 35 parts by weight ethylenepolyglycolmonomethyl ether.

Emulsifier: 35 parts by weight nonylphenolpolyglycol ether.

To produce a suitable preparation of active compound, 30 parts by weight of the active substance concerned is mixed with the stated amount of solvent containing the proportion stated above of emulsifier, and the concentrate so obtained is diluted with water to the desired concentration.

About 20 fly larvae (*Lucilia cuprina*) are put into a test-tube which contains about 2 cc. of horse musculature. 0.5 ml. of the preparation of active compound is applied to this horseflesh. After 24 hours, the degree of destruction is determined as a percentage. 100% means that all, and 0% that none, of the larvae have been killed.

The results obtained can be seen from Table 7.

EXAMPLE 8

3 parts of active compound are mixed with 7 parts of a mixture of equal parts by weight of ethyleneglycolmonomethyl ether and nonylphenolpolyglycol ether. The emulsion concentrate so obtained is diluted with water to the application concentration desired in each case.

Adult, gorged female ticks of the species *Boophilus microplus* (resistant) are immersed for one minute in this preparation of active compound. After immersion of, in each case, 10 female specimens of the various strains of ticks, each individual tick is transferred into a plastic dish, the bottom of which is covered with a filter paper disc. After 35 days, the effectiveness of the preparation of active compound is determined by ascertaining the inhibition of the depositing of fertile eggs compared with the egg deposition of untreated control ticks. The effect is stated in percent, 100% meaning that fertile eggs ceased to be deposited, and 0% meaning that the ticks have deposited eggs in normal manner like the untreated control ticks.

The active compounds investigated, the concentrations tried, the parasites tested and the findings obtained can be seen from the following Table 7.

The following examples illustrate the preparation of the novel compounds and their starting materials.

EXAMPLE 9

The benzoylpropionitrile derivatives required as starting material can be obtained according to the following method:

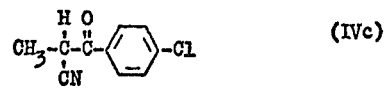

369 g. (2 moles) of 4-chlorobenzoic acid ethyl ester and 108 g. (2 moles) of sodium methylate are stirred together at 50° C. to give a homogeneous mass. At 80° C., 137 g. (2.5 moles) of propionitrile are then introduced under the surface of the reaction mixture and the bath temperature is increased to 120–140° C. After 12 hours, the reaction mixture is poured into water. The mixture is extracted once with methylene chloride to remove neutral compounds, it is then acidified with concentrated hydrochloric acid, and the acidic solution is extracted several times with methylene chloride. After drying over sodium sulfate, the methylene chloride is drawn off and the solid residue is distilled. It boils at 128° C./2 mm. Hg. After cooling, the distillate solidifies and is completely purified by crystallization from ligroin. Colorless crystals of M.P. 55–57° C. are obtained. The yield is 88 g. (23% of theory).

*Analysis.*—Calculated for $C_{10}H_8ClNO$ (molecular weight 193.5) (percent): C, 62.0; H, 4.14; N, 7.23. Found (percent): C, 61.9; H, 4.10; N, 6.90.

TABLE 7

| Active compound | | Concentration of active compound in p.p.m. | Degree of destruction in percent (*Lucilia cuprina*) | Concentration of active compound in p.p.m. | Inhibition of egg deposition in percent (*Boophilus microplus*) | |
|---|---|---|---|---|---|---|
| | | | | | Ridgeland strain | Biarra strain |
| NC(H₃C)C=C—O—P(OC₂H₅)₂ (with S, phenyl) | (1) | 300<br>100<br>30<br>10<br>3 | 100<br>100<br>100<br>100<br>100 | 10,000<br>1,000 | >50<br><50 | 100<br><50 |
| NC(H₃C)C=C—O—P(OC₂H₅)₂ (with S, phenyl-CH₃) | (4) | 300<br>30 | 100<br>100 | 10,000 | >50 | >50 |
| NC(H₃C)C=C—O—P(OC₂H₅)₂ (with S, phenyl-Cl) | (8) | 300<br>100<br>30 | 100<br>100<br>100 | 10,000<br>1,000 | >50<br>>50 | >50<br>>50 |
| NC(H₃C)C=C—O—P(S)(OC₂H₅)(C₂H₅) (with phenyl-Cl) | (9) | 300<br>100<br>30 | 100<br>100<br><50 | 10,000<br>1,000 | >50<br><50 | >50<br>>50 |

If the alcohol forming during the condensation is distilled out of the reaction mixture from time to time, the yield can be increased to 165 g. (43% of the theory).

Analogously, the following compounds are synthesized:

| Constitution | | Physical properties | Yield (percent of theory) |
|---|---|---|---|
| CH₃—C(H)(CN)—C(O)—C₆H₅ | (IVa) | $n_D^{20}$=1.5398 B.P. 128° C./3 mm. Hg | 41 |
| CH₃—C(H)(CN)—C(O)—C₆H₄—CH₃ | (IVd) | B.P. 120° C./2 mm. Hg | 30 |
| CH₃—C(H)(CN)—C(O)—C₆H₄—OCH₃ | (IVe) | $n_D^{23}$=1.5340 B.P. 140° C./2 mm. Hg | 19 |
| CH₃—C(H)(CN)—C(O)—C₆H₃(Br) | (IVf) | B.P. 136° C./2 mm. Hg | 15 |

EXAMPLE 10

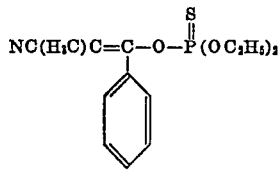

(1)

To a mixture of 31.8 g. (0.2 mole) of 2-benzoylpropionitrile (IVa), 29.1 g. (0.21 mole) of anhydrous potassium carbonate and 200 ml. acetone there are added dropwise, at 20° C., 37.7 g. (0.2 mole) of O,O-diethyl-thionophosphoric acid ester chloride and the mixture is then heated for 5 hours to 50° C. After cooling, the reaction mixture is filtered, the filtrate is taken up in 600 ml. of methylene chloride and the methylene chloride solution is washed with water/sodium bicarbonate. After drying has been effected over sodium sulfate, the solvent is drawn off, and the residue is slightly distilled. There remains behind an oil with the refractive index $$n_D^{21}=1.5340$$

The yield is 51 g. (82% of theory).

*Analysis.*—Calculated for C₁₄H₁₈NO₃PS (molecular weight 311) (percent): N, 4.5; P, 9.97; S, 10.29. Found (percent): N, 4.84; P, 9.64; S, 10.27.

EXAMPLE 11

In analogous manner, the following compounds are obtained:

| Formula | | Physical properties (refractive index, boiling point) | Yield (percent of theory) |
|---|---|---|---|
| NC(H₃C)C=C(C₆H₅)—O—P(S)(OC₂H₅)(C₂H₅) | (2) | $n_D^{20}$=1.5508 B.P. 160–165° C./0.02 mm. Hg (yellow oil) | 64 |
| NC(CH₃)C=C(C₆H₅)—O—P(S)(C₆H₅)(OC₂H₅) | (3) | $n_D^{20}$=1.5878 (yellow oil) | 78.5 |
| NC(H₃C)C=C(C₆H₄CH₃)—O—P(S)(OC₂H₅)₂ | (4) | $n_D^{23}$=1.5353 B.P. 160° C./0.01 mm. Hg (yellow oil) | 69 |
| NC(H₃C)C=C(C₆H₄CH₃)—O—P(S)(OC₂H₅)(C₂H₅) | (5) | $n_D^{23}$=1.5492 B.P. 160° C./0.01 mm. Hg (yellow oil) | 45 |

TABLE—Continued
| Formula | | Physical properties (refractive index, boiling point) | Yield (percent of theory) |
|---|---|---|---|
|  | (6) | $n_D^{25}=1.5454$<br>B.P. 170° C./0.02 mm. Hg<br>(yellow oil) | 39 |
| 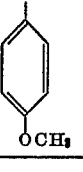 | (7) | $n_D^{25}=1.5571$<br>B.P. 180° C./0.04 mm. Hg<br>(brown oil) | 47 |
| 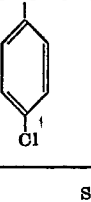 | (8) | $n_D^{24}=1.5450$<br>(yellow oil) | 88 |
|  | (9) | $n_D^{24}=1.5623$<br>(yellow oil) | 77 |
|  | (10) | $n_D^{24}=1.5580$<br>(colourless oil) | 67 |
|  | (11) | $n_D^{24}=1.5293$<br>(yellow oil) | 70 |
| 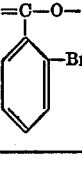 | (12) | $n_D^{25}=1.5453$<br>(yellow oil) | 77 |
|  | (13) | $n_D^{25}=1.5639$<br>(yellow oil) | 72 |

It will be appreciated that the instant specification and examples are set forth by way of illustration and not limitation and that various modifications and changes may be made without departing from the spirit and scope of the present invention.

What is claimed is:

1. 1-phenyl - 2 - cyano-2-methylvinyl-thionophosphoric (phosphonic) acid esters of the general formula:

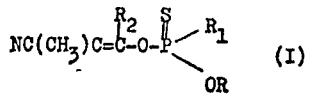
(I)

in which

R is an alkyl radical with 1 to 6 carbon atoms, $R_1$ is an alkyl or alkoxy radical with 1 to 6 carbon atoms or a phenyl radical, and $R_3$ is a phenyl radical optionally substituted by at least one halogen, nitro, lower alkyl or alkoxy.

2. Compounds according to claim 1 in which R has 1–4 carbon atoms, $R_1$ has 1–4 carbon atoms or is a phenyl radical and $R_2$ is a phenyl radical optionally substituted by at least one chlorine, bromine, alkyl or alkoxy radical with 1–4 carbon atoms.

3. A compound according to claim 1 wherein such compound is O,O-diethyl-O-[1-phenyl-2-cyano-2-methylvinyl]-thionophosphate of the formula

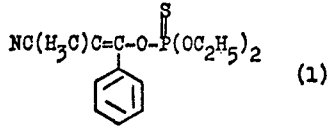
(1)

4. A compound according to claim 1 wherein such compound is O-ethyl-O-[1 - phenyl - 2 - cyano-2-methyl-vinyl]-ethanethionophosphonate of the formula

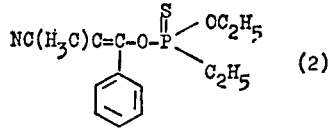
(2)

5. A compound according to claim 1 wherein such compound is O-ethyl - O - [1 - (4' - chlorophenyl) - 2 - cyano-2-methyl-vinyl]-ethanethionophosphate of the formula

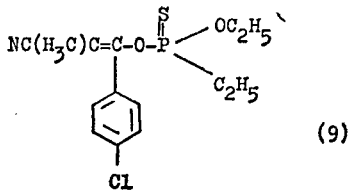
(9)

6. A compound according to claim 1 wherein such compound is O,O-diethyl-O-[1-(2' - bromophenyl)-2-cyano-2-methyl-vinyl]-thionophosphate of the formula

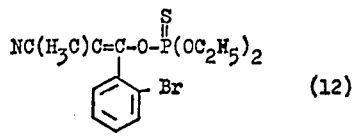
(12)

7. A compound according to claim 1 wherein such compound is O-ethyl-O-[1-(2'-bromophenyl) - 2 - cyano-2-methyl-vinyl]-methanethionophosphonate of the formula

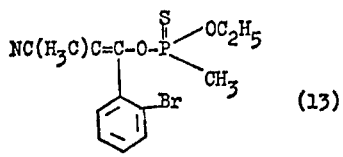
(13)

References Cited

FOREIGN PATENTS 2,926    3/1960    Japan _____ 260—940

OTHER REFERENCES

Nichizawa: "Bull. Biol. Chem." (Japan), vol. 25, No. 1 (1961), pp. 61–5.

LEWIS GOTTS, Primary Examiner

A. H. SUTTO, Assistant Examiner

U.S. Cl. X.R.

260—465 R, 465 F, 972; 424—210

UNITED STATES PATENT OFFICE
CERTIFICATE OF CORRECTION

Patent No. 3,775,517  Dated November 27, 1973

Inventor(s) Hans-Jochem RIEBEL, ET. AL.

It is certified that error appears in the above-identified patent and that said Letters Patent are hereby corrected as shown below:

Col. 2, Formula (III), change "$\underset{S}{\overset{\|}{P}}\underset{R}{\overset{O}{\diagup}}$" to -- $\underset{S}{\overset{\|}{P}}\underset{R_1}{\overset{OR}{\diagup}}$ --

Col. 9, line 44, Table 2, Composition 12, under " Concentration of active compound in percent" change " 0.01", second occurrence, to -- 0.001 --.

Col. 10, line 36, Table 3, Composition 1, under "Degree of destruction in percent after 2 days", change " 0" to --90 --.

Signed and sealed this 6th day of August 1974.

(SEAL)
Attest:

McCOY M. GIBSON, JR.           C. MARSHALL DANN
Attesting Officer              Commissioner of Patents